US012624807B1

(12) United States Patent
He

(10) Patent No.: US 12,624,807 B1
(45) Date of Patent: May 12, 2026

(54) SMD LED LIGHT STRING

(71) Applicant: SHANGYOU JIAYI LIGHTING PRODUCT CO., LTD., Shangyou City (CN)

(72) Inventor: Yaowen He, Shangyou City (CN)

(73) Assignee: SHANGYOU JIAYI LIGHTING PRODUCT CO., LTD., Shangyou City (CN)

( * ) Notice: Subject to any disclaimer, the term of this patent is extended or adjusted under 35 U.S.C. 154(b) by 0 days.

(21) Appl. No.: 19/340,353

(22) Filed: Sep. 25, 2025

(30) Foreign Application Priority Data

Aug. 22, 2025 (CN) ........................ 202521797101.6

(51) Int. Cl.
*F21S 4/10* (2016.01)
*F21V 23/00* (2015.01)
*F21V 23/06* (2006.01)
*F21Y 115/10* (2016.01)

(52) U.S. Cl.
CPC .............. *F21S 4/10* (2016.01); *F21V 23/001* (2013.01); *F21V 23/06* (2013.01); *F21Y 2115/10* (2016.08)

(58) Field of Classification Search
CPC .......... F21S 4/10; F21V 23/001; F21V 23/06; F21Y 2115/10
USPC .................................................... 362/249.04
See application file for complete search history.

(56) References Cited

U.S. PATENT DOCUMENTS 5,626,415 A * 5/1997 Huang .................... F21V 17/06 362/267
2008/0200061 A1* 8/2008 Lee ........................... F21S 4/10 439/427
2018/0340676 A1* 11/2018 Tsai .......................... F21S 4/10
2019/0341718 A1* 11/2019 Yu ......................... F21V 21/096
2025/0314374 A1* 10/2025 Chen ......................... F21S 4/10

* cited by examiner

*Primary Examiner* — Laura K Tso
(74) *Attorney, Agent, or Firm* — AVEK IP, LLC

(57) ABSTRACT

Some embodiments of the disclosure provide an SMD LED light string. In some examples, the SMD LED light string includes light string wires. The light string wires are connected with a plurality of SMD LED lights. Each SMD LED light includes a light holder having a lower end connected to a bulb shell and an upper end connected to an end cap; the light holder has a receiving cavity that runs through from top to bottom, and an SMD LED assembly is arranged in the receiving cavity. The light string wires are electrically connected to the SMD LED assemblies. In other examples, the disclosure may have simple structure and low manufacturing cost, the disclosure may show high protective performance; and the disclosure may show high assembly and production efficiency.

8 Claims, 9 Drawing Sheets

SMD LED LIGHT STRING

FIELD OF THE DISCLOSURE

The disclosure relates generally to the field of lighting. More specifically, the disclosure relates to SMD LED light strings.

BACKGROUND

1. Technical Field

The present disclosure relates to the technical field of lights, in particular to an SMD LED light string.

2. Description of Related Art

As LED technology advances rapidly, light strings are widely used in decorative lighting, landscape lighting, festive atmosphere creation and other fields due to their advantages of energy saving, long service life, and rich colors. In traditional light strings, such as the light string disclosed in Chinese Patent CN222760737U, multiple LED beads are usually connected in series or parallel, and current is led to each light-emitting node by means of branch wires. However, this kind of light string has a complex structure and high manufacturing cost, and traditional light strings require additional branch wires and connecting parts, resulting in increased material costs, cumbersome assembly processes, and low production efficiency.

SUMMARY

In some embodiments, the present disclosure provides a surface mounted device (SMD) light emitting diode (LED) light string, including light string wires having one ends connected to a plug. The light string wires are connected with a plurality of SMD LED lights. Each SMD LED light includes a light holder having a lower end connected to a bulb shell and an upper end connected to an end cap; the light holder has a receiving cavity that runs through from top to bottom along a central axis, and an SMD LED assembly is arranged in the receiving cavity. The light string wires are electrically connected to the SMD LED assemblies. Each SMD LED assembly has at least a light-emitting portion extending into the bulb shell.

Further, the SMD LED assembly includes a housing and a light-emitting unit, a sink for mounting the light-emitting unit is arranged in the housing, and the housing at least has a transparent portion corresponding to the light-emitting unit.

Further, the light string wires are provided with bent portions extending into the sink, and the bent portions are electrically connected to the light-emitting unit.

Further, the light-emitting unit includes a first connecting plate, a plurality of connecting terminals are arranged on an upper surface of the first connecting plate, the light string wire is electrically connected to the connecting terminals, and an LED bead is arranged on a lower surface of the first connecting plate.

Further, the light-emitting unit includes a first connecting plate and a second connecting plate, a plurality of connecting terminals are arranged on an upper surface of the first connecting plate, the light string wires are electrically connected to the connecting terminals, a stacking gap is provided between the first connecting plate and the second connecting plate, an LED bead is arranged on a lower surface of the second connecting plate, and the first connecting plate and the second connecting plate are electrically connected.

Further, the sink is further provided with a filler adhesive for sealing the light-emitting unit.

Further, a limiting block is arranged in the housing near the transparent portion and abuts against the light-emitting unit to create a gap between the LED bead and the transparent portion.

Further, a stepped portion is arranged in the receiving cavity, the housing is provided with an annular protrusion, a lower surface of the annular protrusion is matched with the stepped portion, and an upper surface of the annular protrusion abuts against the end cap.

Further, the housing has a first split housing and a second split housing, and the second split housing is a transparent housing and is engaged with the first split housing or with the light-emitting unit.

Further, a first annular insertion groove is arranged outside the light holder, the end cap is inserted into the first annular insertion groove and is in limited connection with the light holder, a positioning port is provided at an upper end of the light holder, and the end cap is provided with a positioning block that is in connection with the positioning port.

Further, a plurality of light string wires are arranged side by side, the end cap cooperates with the light holder to form wire fixing holes for fixing the light string wires, at least two wire fixing holes are provided for the light string wires to enter and exit the light holder, and the wire fixing holes are provided with wire grooves for separating the light string wires.

Further, a second annular insertion groove is arranged at a lower end of the light holder, and the bulb shell is provided with an annular insertion portion. The annular insertion portion is inserted into the second annular insertion groove, so that the bulb shell and the light holder are tightly connected.

BRIEF DESCRIPTION OF THE DRAWINGS

Illustrative embodiments of the present disclosure are described in detail below with reference to the attached drawing figures.

Reference signs: light string wire—1, plug—11, bent portion—111, SMD LED light—2, light holder—21, end cap—22, receiving cavity—23, stepped portion—24, first annular insertion groove—25, positioning port—26, positioning block—27, second annular insertion groove—28, bubble shell—3, annular insertion portion—31, SMD LED assembly—4, housing—41, sink—411, first split housing—412, second split housing—413, limiting block—414, light-emitting unit—42, first connecting plate—421, second connecting plate—422, connecting terminal—423, LED bead—424, electrical connection member—425, transparent portion—43, filler adhesive—44, annular protrusion—45, wire fixing hole—5, wire groove—51, and central axis—X.

DETAILED DESCRIPTION

Figure 1:
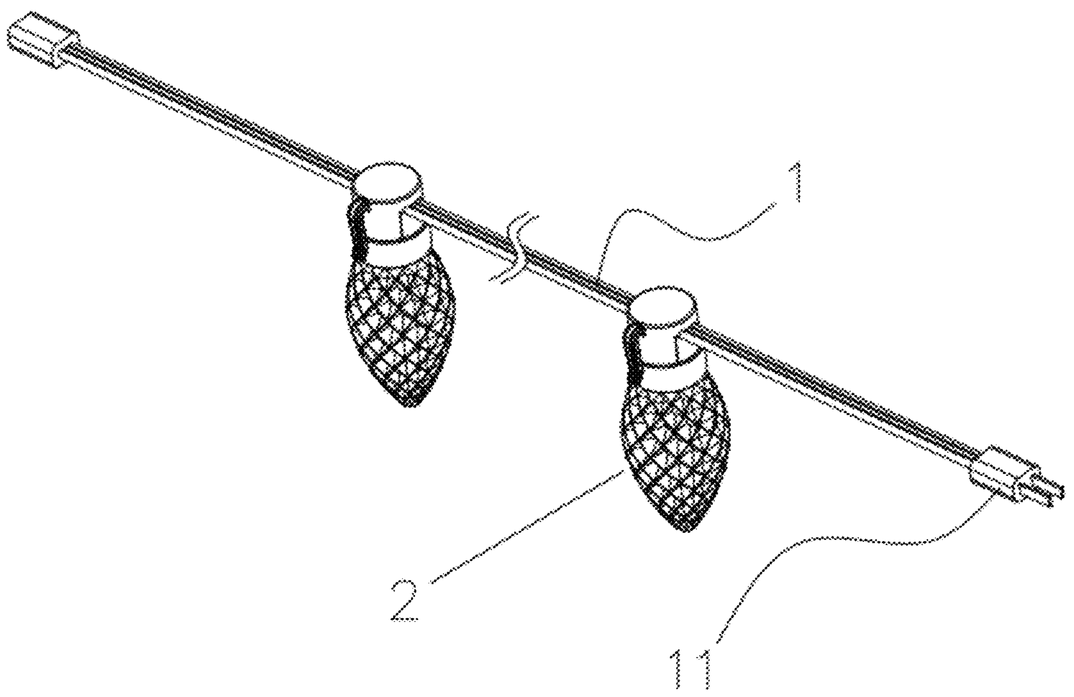
FIG. 1 is a three-dimensional schematic diagram of a light string according to an embodiment of the disclosure.
Figure 2:
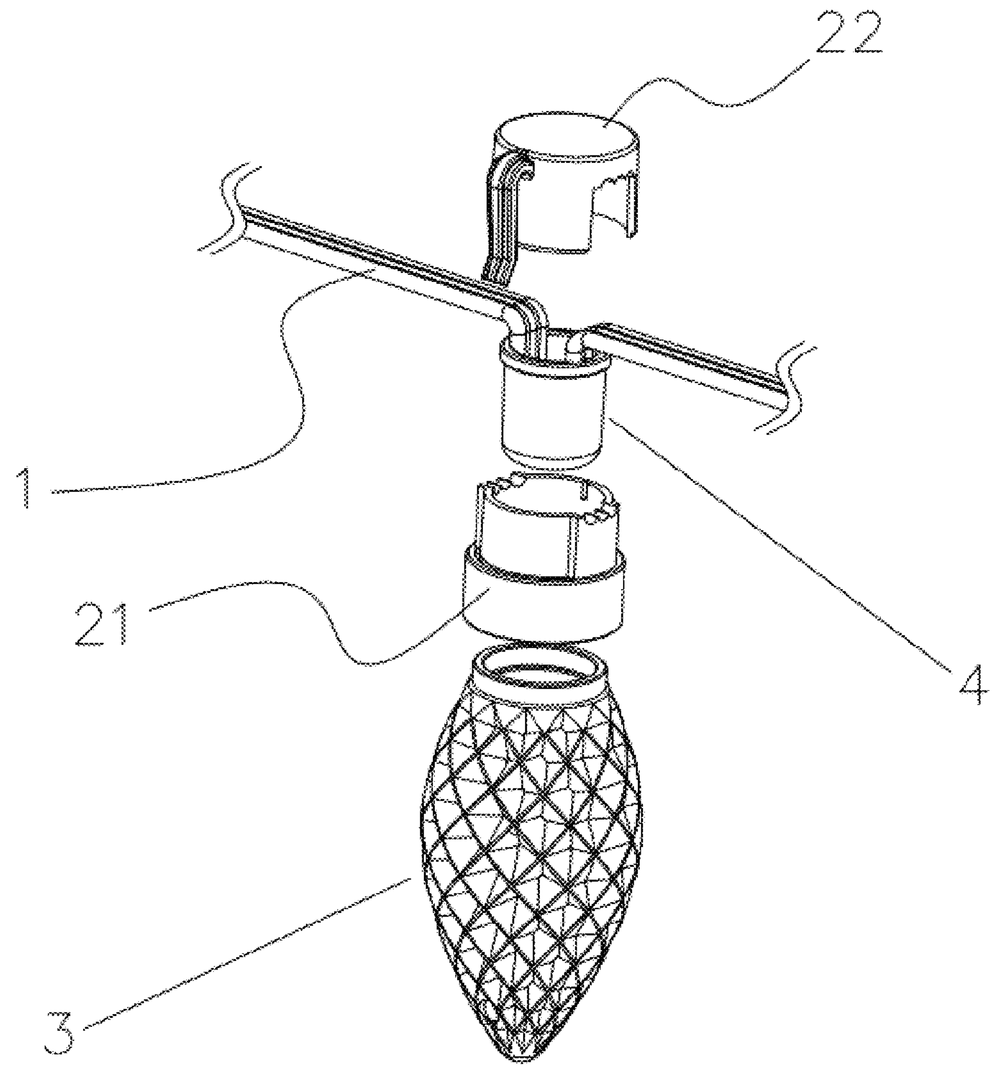
FIG. 2 is a partial exploded structural diagram of the present disclosure.
Figure 3:
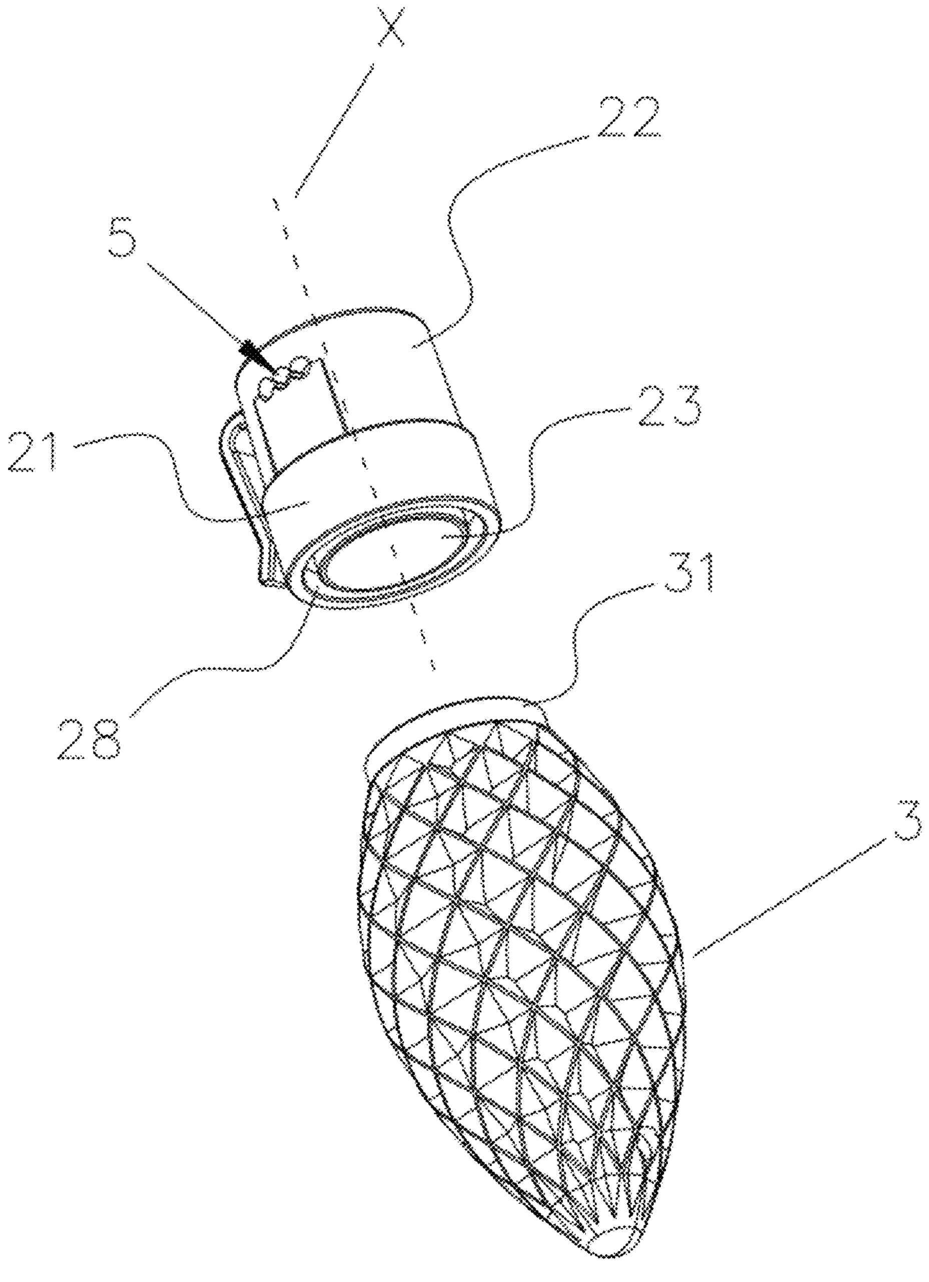
FIG. 3 is a partial exploded structural diagram of an SMD LED light according to an embodiment of the disclosure.
Figure 4:
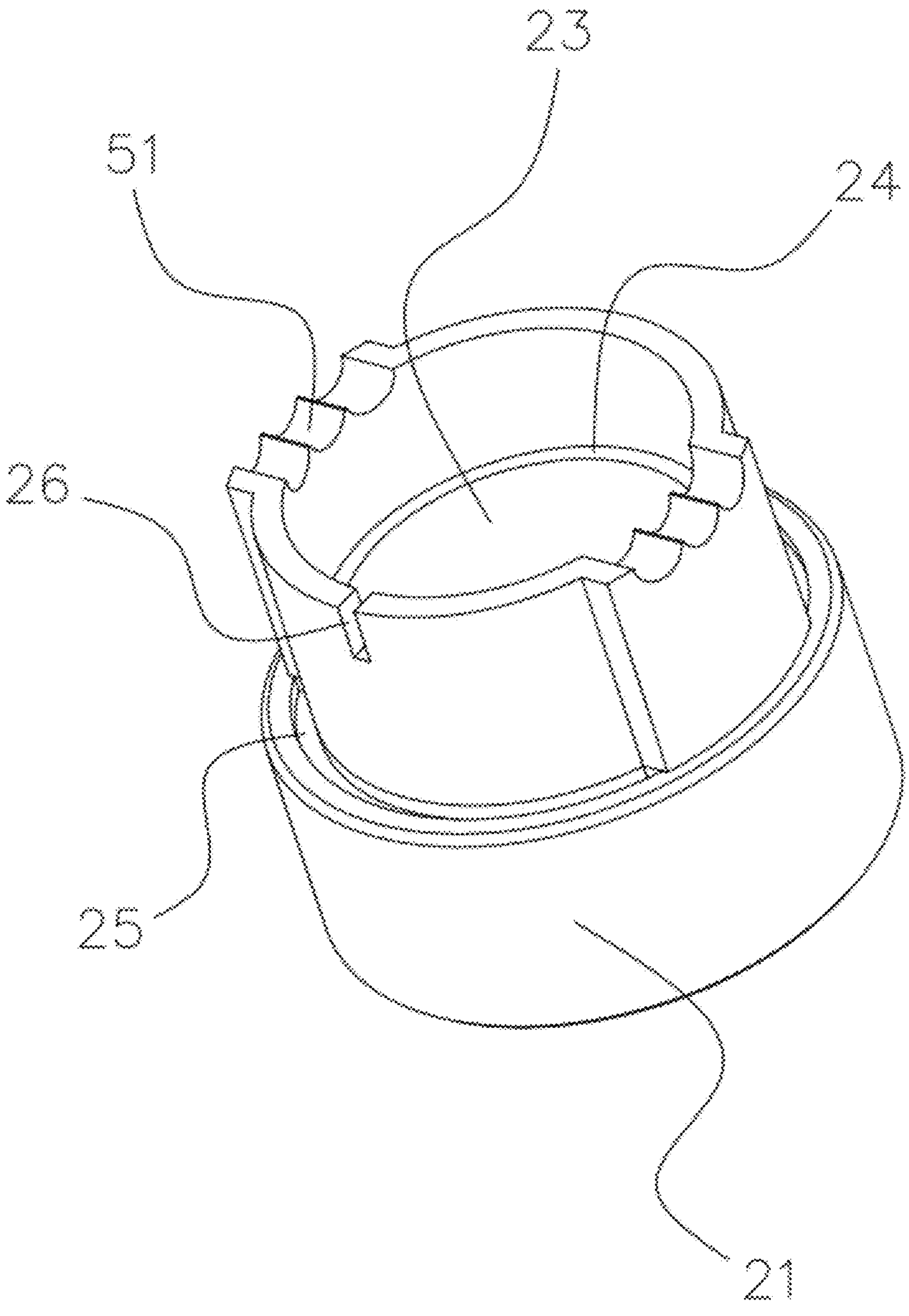
FIG. 4 is a schematic structural diagram of a light holder according to an embodiment of the disclosure.
Figure 5:
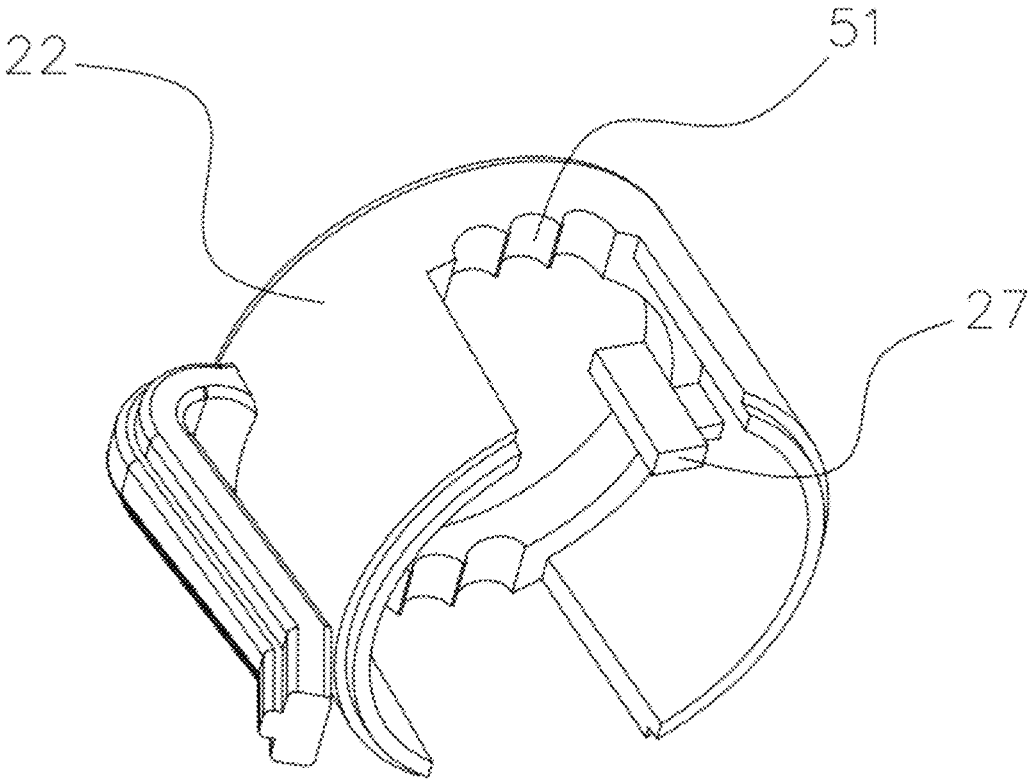
FIG. 5 is a schematic structural diagram of an end cap according to an embodiment of the disclosure.
Figure 6:
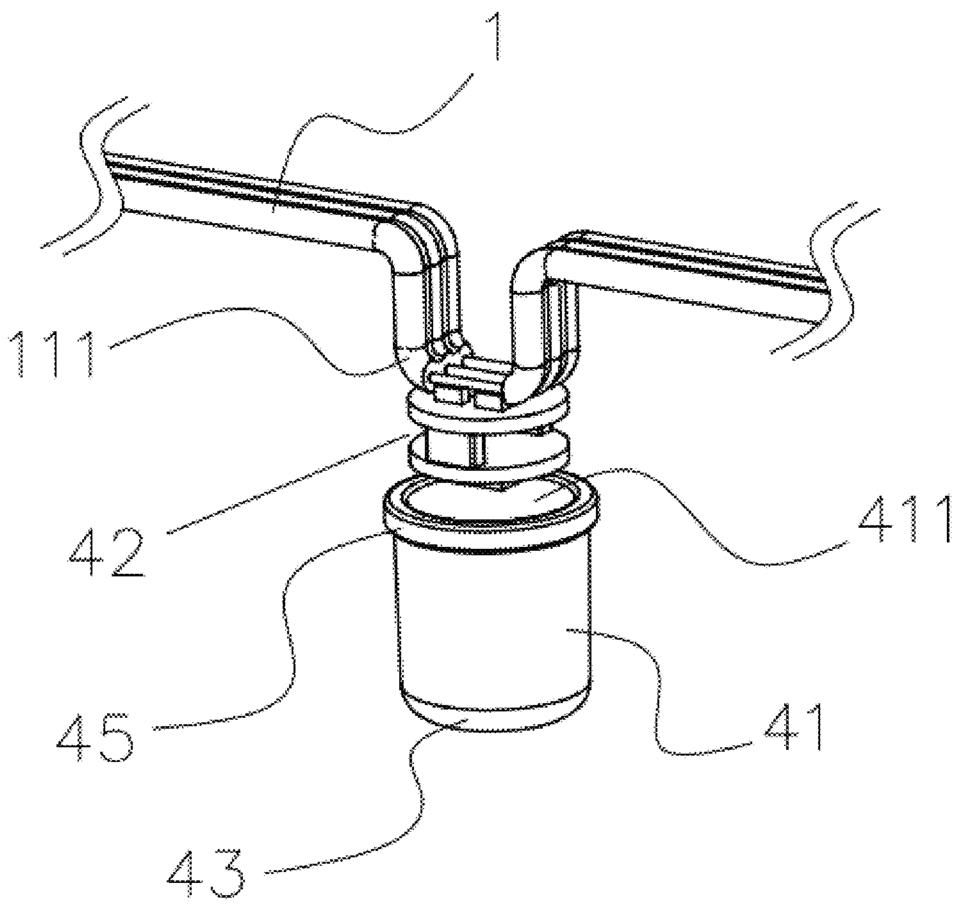
FIG. 6 is a partial exploded structural diagram of an SMD LED assembly according to an embodiment of the disclosure.
Figure 7:
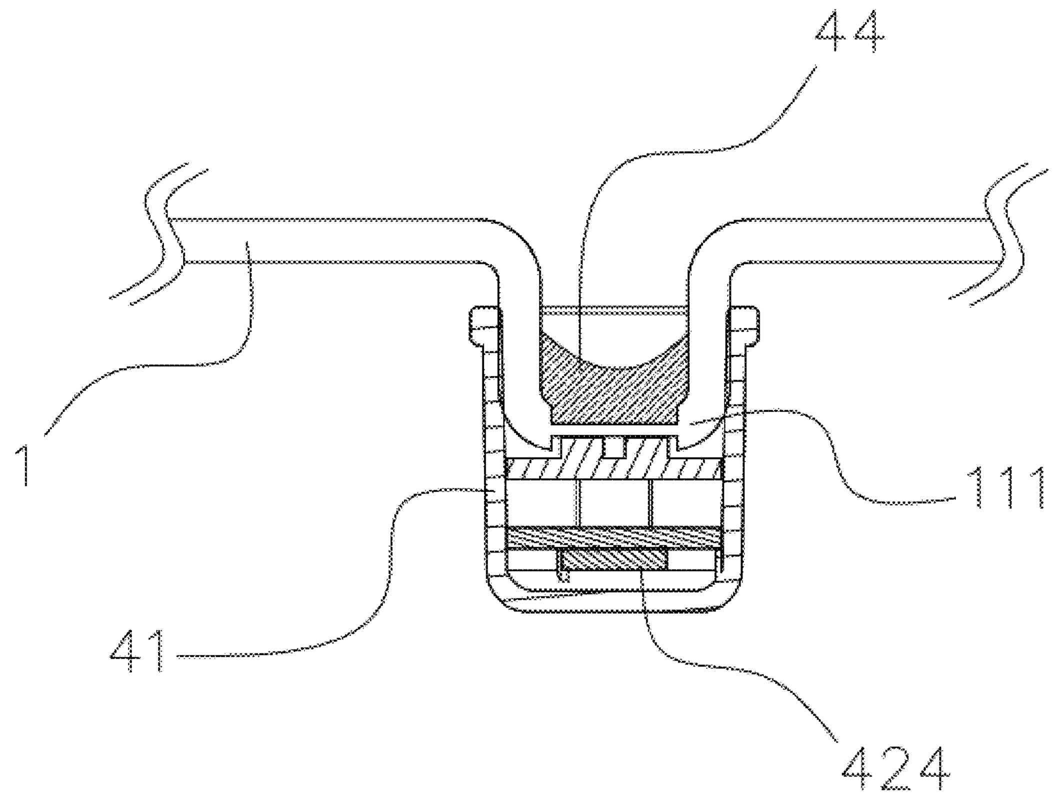
FIG. 7 is a sectional structural diagram of an SMD LED assembly according to an embodiment of the disclosure.
Figure 8:
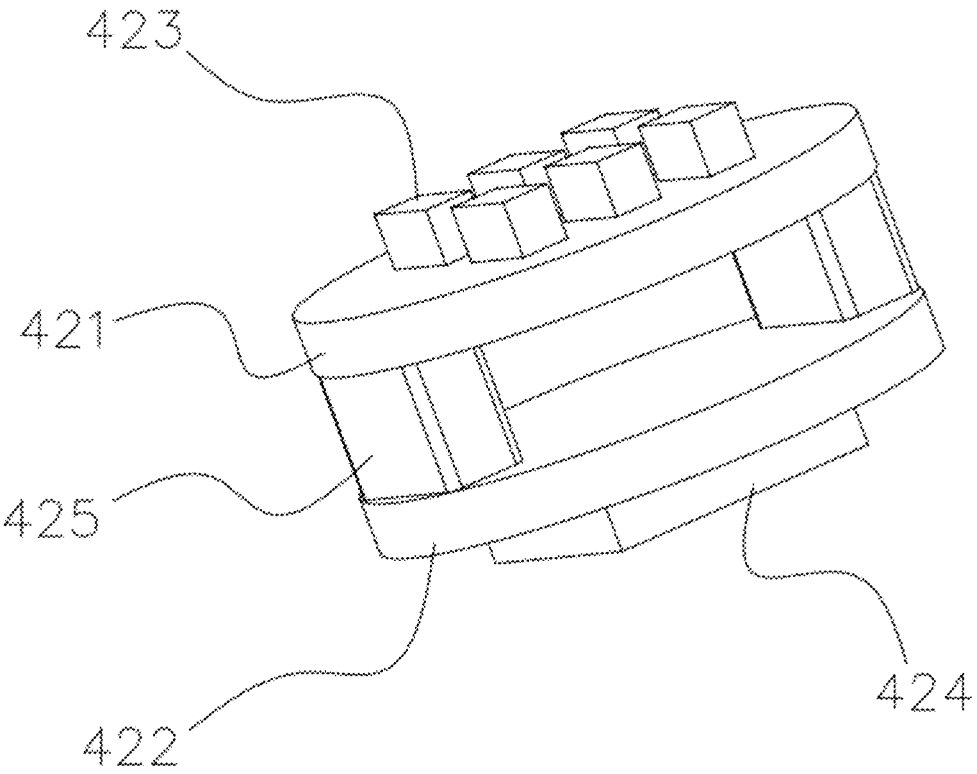
FIG. 8 is a schematic structural diagram of a light-emitting unit according to an embodiment of the disclosure.
Figure 9:
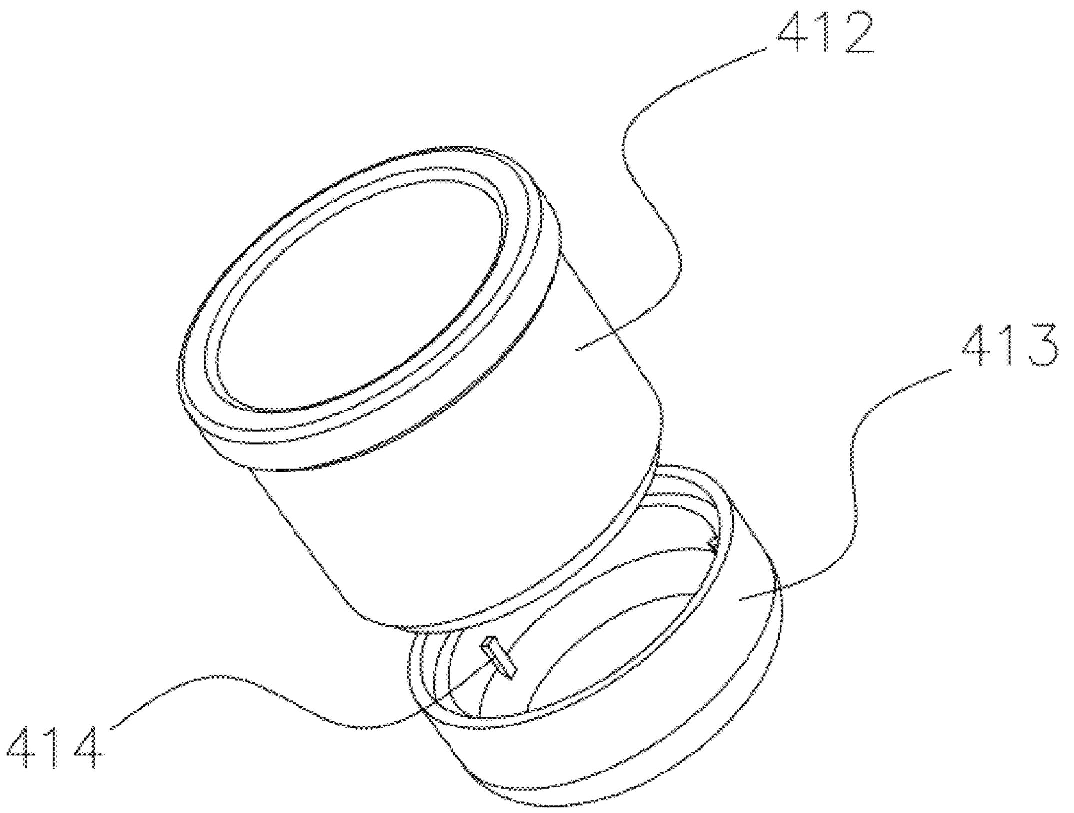
FIG. 9 is a schematic structural diagram of a first split housing and a second split housing according to an embodiment of the disclosure.

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure. The present disclosure is described in detail below in conjunction with FIGS. 1-9.

The SMD LED light string of the present disclosure includes light string wires 1, having one ends connected to a plug 11. A male plug is generally selected to serve as the plug in 11 and is configured to be plugged in a power supply to power up the light string. The other ends of the light string wires 1 may be connected to a female plug, and the male plug is inserted in the female plug to realize a circuit interconnection of two light string wires 1, so that multiple light strings are connected in series for use, thereby realizing the connection of more than two such light strings to form an extension. The light string wires are connected with a plurality of SMD LED lights 2. Each SMD LED light 2 includes a light holder 21 having a lower end connected to a bulb shell 3 and an upper end connected to an end cap 22; the light holder 21 has a receiving cavity 23 that runs through from top to bottom along a central axis X, and an SMD LED assembly 4 is arranged in the receiving cavity 23. The light string wires 1 are electrically connected to the SMD LED assemblies 4. Each SMD LED assembly 4 at least has a light-emitting portion extending into the bulb shell 3. In this solution, the SMD LED assemblies 4 of the light string of the present disclosure are attached and connected to conductive parts of the light string wires 1, and the plurality of SMD LED assemblies 4 are connected in parallel with the light string wires 1 to form lighting nodes of the light string. Compared with the traditional string lights, the present disclosure saves traditional parts such as bulb metal caps, threaded metal caps and branch wires, that guide current from the light string wires 1, thereby realizing simple structure and low manufacturing cost. During the assembly and production of the light string, the SMD LED assemblies 4 are first fixedly connected to the wires and then placed into the light holders 21, and then the end caps 22 and the bulb shells 3 are fastened, thus completing the assembly. In this way, the assembly and production efficiency of the light string is high.

The SMD LED assembly 4 includes a housing 41 and a light-emitting unit 42, a sink 411 for mounting the light-emitting unit 42 is arranged in the housing 41, and the housing 41 at least has a transparent portion 43 corresponding to the light-emitting unit 42. When the SMD LED assembly 4 is assembled in the receiving cavity 23, the transparent portion 43 extends into the bulb shell 3 through an opening at the lower end of the receiving cavity 23. The housing 41 and the light-emitting unit 42 constitute the SMD LED assembly 4. Light emitted by the light-emitting unit 42 can penetrate the transparent portion 43 to cause the bulb 3 to emit light, thereby lighting the SMD LED light 2.

Each of the light string wires 1 is provided with a bent portion 111 extending into the sink 411, and the bent portion 111 is electrically connected to the light-emitting unit 42. The bent portion 111 at least includes a portion of the light string wire 1, which has insulating rubber peeled off and exposes a wire core, so that the light-emitting unit 42 is attached to the wire core to form a parallel circuit. After the SMD LED assembly 4 is assembled in the receiving cavity 23, the bent positions of the bent portions 111 can achieve a limiting effect with the light holder 21. When the light string wires 1 are pulled by external force, the bent portions 111 can provide a certain resistance against the external pull force, thereby improving the strength and stability of connection between the light string wires 1 and the SMD LED assembly 4.

A plurality of light string wires 1 are arranged side by side, the end cap 22 cooperates with the light holder 21 to form wire fixing holes 5 for fixing the light string wires 1, at least two wire fixing holes 5 are provided for the light string wires 1 to enter and exit the light holder 21, and the wire fixing holes 5 are provided with wire grooves 51 for separating the light string wires 1. In order to improve the tightness of the light holder 21, the shape of the wire fixing holes 5 is consistent with that of the rubber of the light string wires 1. The wire fixing holes 5 are preferably circular and in this case, if the outer rubber of the light string wires 1 is in an irregular shape, the circular wire fixing holes 5 can hold the light string wires 1 tightly so that the light string wires 1 are fixed in the wire fixing holes 5. At least two light string wires 1 are arranged side by side, and the two light string wires 1 conduct a two-stage circuit to the light-emitting unit 42. As a preferred embodiment, in this technical solution, three light string wires 1 are arranged side by side, which are respectively two-stage wires for conducting a two-stage circuit and a control wire for transmitting control signals to control the light-emitting unit 42. Both the end cap 22 and the light holder 21 are provided with a plurality of wire grooves 51 which are arranged side by side, and the number of wire grooves 51 is consistent with the number of light string wires 1. During assembly, first, the SMD LED assembly 4 connected with the light string wires 1 is placed into the receiving cavity 23 from the upper end of the light holder 21, the light string wires 1 are placed in the wire grooves 51 of the light holder 21 for positioning, and then the end cap 22 is assembled on the light holder 21 so that the end cap 22 and the light holder 21 cooperate to fix the light string wires 1 and the SMD LED assembly 4, thus completing the assembly of the SMD LED light 2. During the assembly process, the bulb shell 3 may be pre-assembled on the light holder 21, reducing assembly steps and improving assembly efficiency.

The light-emitting unit 42 includes a first connecting plate 421, a plurality of connecting terminals 423 are arranged on an upper surface of the first connecting plate 421, the light string wires 1 are electrically connected to the connecting terminals 423, and an LED bead 424 is arranged on a lower surface of the first connecting plate 421. Each of the connecting terminals 423 is electrically connected to a single light string wire 1. In the case where two connecting terminals 423 are connected to two light string wires 1, the two light string wires 1 provide a two-stage circuit so that the LED light bead 424 emits light. In the case where three connecting terminals 423 are connected to three light string wires 1, two of the light string wires 1 provide a two-stage circuit so that the LED light bead 424 emits light, and the other light string wire 1 can provide a control signal so that the LED light bead 424 changes color, flashing frequency, etc. to improve the use atmosphere of the light string.

The light-emitting unit 42 includes a first connecting plate 421 and a second connecting plate 422, a plurality of connecting terminals 423 are arranged on an upper surface of the first connecting plate 421, the light string wires 1 are electrically connected to the connecting terminals 423, a stacking gap is provided between the first connecting plate 421 and the second connecting plate 422, an LED bead 424 is arranged on a lower surface of the second connecting plate 422, and the first connecting plate 421 and the second connecting plate 422 are electrically connected. In this solution, an electrical connection member 425 is arranged between the first connecting plate 421 and the second connecting plate 422, and the electrical connection member 425 may be a conductive part such as a resistor. The light string wires 1 supply power to the first connecting plate 421, and the first connecting plate 421 supplies power to the second connecting plate 422 by means of the electrical connection member 425, thereby causing the LED bead 424 to emit light. In this structure, the LED bead 424 illuminates a cold light source, and it is generally difficult to generate large heat. The first connecting plate 421 is configured as a printed circuit board, and an electrolytic copper foil or a rolled copper foil thereof will generate heat during the process of guiding current. By providing a stacking gap between the first connecting plate 421 and the second connecting plate 422, the influence of heat generated by the first connecting plate 421 on the LED bead 424 can be reduced and the service life of the LED bead 424 can be improved.

The sink 411 is further provided with a filler adhesive 44 for sealing the light-emitting unit 42. The housing 41 is placed into the receiving cavity 23 from the upper end of the light holder 21, the transparent portion 43 extends from the lower end of the receiving cavity 23 to the bulb shell 3, the sink 411 has a certain depth, and the light-emitting unit 42 is arranged at the bottom of the sink 411. By filling the filler adhesive 44 into the sink 411, the light-emitting unit 42 can be fixed at the bottom of the sink 411 and at the same time, the bent portions 111 of the light string wires 1 can be fixed in the sink 411. Preferably, the filler adhesive 44 may be made of a modified epoxy resin or a silicone. During assembly: Method 1: the light-emitting unit 42 is placed in the sink 411, and then the bent portions 111 of the light string wires 1 are placed in the sink 411, so that the bent portions 111 come into electrical contact with the connecting terminals 423 of the first connecting plate 421, and finally the filler adhesive 44 is filled in, cooled and cured. Method 2: the connecting terminals 423 of the first connecting plate 421 are fixedly connected to the bent portions 111 of the light string wires 1 by means of welding or screwing, and the light-emitting unit 42 is then placed into the sink 411, and finally the filler adhesive 44 is filled in, cooled and cured. In this method, the connection between the light string wires 1 and the light-emitting unit 42 is more stable. Filling the filling adhesive 44 in the sink 411 can not only fix the light-emitting unit 42, but also prevent moisture from affecting the light-emitting unit 42, thus achieving high stability and long service life.

A limiting block 414 is arranged in the housing 41 near the transparent portion 43 and abuts against the light-emitting unit 42 to create a gap between the LED bead and the transparent portion 43. The gap between the LED bead 424 and the transparent portion 43 provides a refraction space for the light emitted by the LED bead 424 to expand the irradiation angle of the light, so that the light more evenly irradiates the bulb shell 3.

A stepped portion 24 is arranged in the receiving cavity 23, the housing 41 is provided with an annular protrusion 45, a lower surface of the annular protrusion 45 is matched with the stepped portion 24, and an upper surface of the annular protrusion 45 abuts against the end cap 22. After the housing 41 is placed into the receiving cavity 23, the lower surface of the annular protrusion 45 abuts against the stepped portion 24 to achieve a limiting effect to limit the depth of the housing 41 being placed into the receiving cavity 23. After the end cap 22 is connected to the light holder 21, the end cap 22 abuts against the upper surface of the annular protrusion 45 to fix the housing 41 and prevent the housing 41 from loosening.

More specifically, a first annular insertion groove 25 is arranged outside the light holder 21, the end cap 22 is inserted into the first annular insertion groove 25 and is in limited connection with the light holder 21, a positioning port 26 is provided at the upper end of the light holder 21, and the end cap 22 is provided with a positioning block 27 that is in positioned connection with the positioning port 26. When the end cap 22 is connected to the light holder 21, the lower end of the end cap 22 is inserted into the first annular insertion groove 25 to form a sealing structure, and at the same time the position of the end cap 22 is limited to prevent the situation that the end cap 22 is pressed excessively during assembly or use, causing the wire fixing holes 5 to be too small and damaging the light string wires 1. When the end cap 22 is assembled to the light holder 21, the positioning block 27 is first aligned with the positioning port 26 to ensure that the end cap 22 is correctly connected to the light holder 21. After the end cap 22 is assembled to the light holder 21, the lower end of the positioning block 27 abuts against the upper surface of the annular protrusion 45 to fix the housing 41.

In order to allow light from the light-emitting unit 42 to exit the housing 41, the housing 41 may be entirely transparent or partially transparent. In this solution, the housing 41 has a first split housing 412 and a second split housing 413. The second split housing 413 is configured as a transparent housing, and the second split housing 413 is engaged with the first split housing 412 or with the light-emitting unit 42. Since the filling adhesive 44 is filled in and cured, the light-emitting unit 42 cannot be taken out of the housing 41 by normal means. In this solution, by configuring the housing 41 to be composed of the first split housing 412 and the second split housing 413, after the second split housing 413 is opened, the light-emitting unit 42 can be taken out of the housing 41. In addition, during assembly, the bent portions 111 of the light string wires 1 may also be fixed at designated positions in the first split housing 412 by using the filler adhesive 44, and the second split housing 413 is connected to the light-emitting unit 42. By means of this method, the SMD LED assembly 4 is formed into a modular assembly structure, thereby achieving higher production and assembly efficiency and facilitating automated assembly.

A second annular insertion groove 28 is arranged at a lower end of the light holder 21, and the bulb shell 3 is provided with an annular insertion portion 31. The annular insertion portion 31 is inserted into the second annular insertion groove 28, so that the bulb shell 3 and the light holder 21 are tightly connected. The second annular insertion groove 28 is elastic and the groove width of the second annular insertion groove 28 is less than the thickness of the annular insertion portion 31. When the bulb shell 3 is connected to the light holder 21, the annular insertion portion 31 squeezes the second annular insertion groove 28 open and is inserted into the second annular insertion groove 28, so that the bulb shell 3 and the light holder 21 are connected and fixed and form a sealed connection, thus achieving waterproof performance. Compared with the threaded connection method, the bulb shell 3 and the light holder 21 in this technical solution is simpler and achieves higher assembly efficiency.

The light string wires 1 are connected with a plurality of SMD LED lights 2. A plurality of SMD LED assemblies 4 being connected in parallel with the light string wires 1 to form the lighting nodes of the light string is preferred for the light string but is not the only option in this solution. A plurality of SMD LED assemblies 4 may also be connected with the light string wires 1 to form a series circuit.

The above contents are only preferred embodiments of the present disclosure. For those of ordinary skill in the art, according to the concept of the present disclosure, modifications may be made to the specific embodiments and the application scope. The contents of this specification should not be understood as limiting the present disclosure.

Various embodiments of the disclosure may have one or more of the following effects. In some embodiments, An objective of the present disclosure is to provide an SMD LED light string, which may have the advantages of low manufacturing cost and easy assembly, in order to solve the shortcomings of the prior art. In other embodiments, the SMD LED light string of the present disclosure includes light string wires having one end connected to a plug. The light string wires are connected with a plurality of SMD LED lights. Each SMD LED light includes a light holder having a lower end connected to a bulb shell and an upper end connected to an end cap; the light holder has a receiving cavity that runs through from top to bottom along a central axis, and an SMD LED assembly is arranged in the receiving cavity; the light string wires are electrically connected to the SMD LED assemblies; and each SMD LED assembly at least has a light-emitting portion extending into the bulb shell. In further embodiments, compared with the prior art, the present disclosure may have the following advantages: 1. a plurality of SMD LED assemblies are connected in parallel to the wires to form lighting nodes of the light string, saving branch wires, bulb metal caps and other parts, and realizing simple structure and low manufacturing cost; 2. the SMD LED assembly includes a housing in which a light-emitting unit is placed, thereby achieving high protective performance; and 3. the SMD LED assemblies are fixedly connected to the wires and placed in the light holders, and then the end caps and the bulb shells are fastened, thus completing the assembly. In this way, the assembly and production efficiency of the light string may be high.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A Surface Mounted Device (SMD) Light Emitting Diode (LED) light string, comprising light string wires (1) having one ends connected to a plug (11), the light string wires (1) being connected with a plurality of SMD LED lights (2), wherein:

each SMD LED light (2) comprises a light holder (21) having a lower end connected to a bulb shell (3) and an upper end connected to an end cap (22); the light holder (21) has a receiving cavity (23) that runs through from an upper end to a lower end along a central axis, and an SMD LED assembly (4) is arranged in the receiving cavity (23); the light string wires (1) are electrically connected to the SMD LED assembly (4); each SMD LED assembly (4) at least has a light-emitting portion extending into the bulb shell (3)); and wherein:

the SMD LED assembly (4) comprises a housing (41) and a light-emitting unit (42), a sink (411) for mounting the light-emitting unit (42) is arranged in the housing (41), and the housing (41) at least has a transparent portion (43) corresponding to the light-emitting unit (42).

2. The SMD LED light string according to claim 1, wherein each of the light string wires (1) is provided with a bent portion (111) extending into the sink (411), and the bent portion (111) is electrically connected to the light-emitting unit (42).

3. The SMD LED light string according to claim 1, wherein the light-emitting unit (42) comprises a first connecting plate (421), a plurality of connecting terminals (423) are arranged on an upper surface of the first connecting plate (421), the light string wires (1) are electrically connected to the connecting terminals (423), and an LED bead (424) is arranged on a lower surface of the first connecting plate (421).

4. The SMD LED light string according to claim 1, wherein the sink (411) is further provided with a filler adhesive (44) for sealing the light-emitting unit (42).

5. The SMD LED light string according to claim 1, wherein a stepped portion (24) is arranged in the receiving cavity (23), the housing (41) is provided with an annular protrusion (45), a lower surface of the annular protrusion (45) is matched with the stepped portion (24), and an upper surface of the annular protrusion (45) abuts against the end cap (22).

6. The SMD LED light string according to claim 1, wherein the housing (41) has a first split housing (412) and a second split housing (413), the second split housing (413) is configured as a transparent housing, and the second split housing (413) is engaged with the first split housing (412) or with the light-emitting unit (42).

7. The SMD LED light string according to claim 1, wherein a first annular insertion groove (25) is arranged outside the light holder (21), the end cap (22) is inserted into the first annular insertion groove (25) and is in connection with the light holder (21), a positioning port (26) is provided at an upper end of the light holder (21), and the end cap (22) is provided with a positioning block (27) that is in positioned connection with the positioning port (26).

8. The SMD LED light string according to claim 1, wherein a plurality of light string wires (1) are arranged side by side, the end cap (22) cooperates with the light holder (21) to form wire fixing holes (5) for fixing the light string wires (1), at least two wire fixing holes (5) are provided for the light string wires (1) to enter and exit the light holder (21), and the wire fixing holes (5) are provided with wire grooves (51) for separating the light string wires (1).

* * * * *